United States Patent
Giovanoni (10) Patent No.: US 12,241,872 B2
(45) Date of Patent: Mar. 4, 2025

(54) MATERIAL TESTING MACHINES WITH MOVABLE LOWER CROSSBEAMS

(71) Applicant: ILLINOIS TOOL WORKS INC., Glenview, IL (US)

(72) Inventor: Daniel Patrick Giovanoni, Norton, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/417,200

(22) Filed: Jan. 19, 2024

(65) Prior Publication Data

US 2024/0159635 A1    May 16, 2024

Related U.S. Application Data (63) Continuation of application No. 17/063,152, filed on Oct. 5, 2020, now Pat. No. 11,921,087.

(51) Int. Cl.
| | | |
|---|---|---|
| *G01N 3/06* | (2006.01) | |
| *G01N 3/04* | (2006.01) | |
| *G01N 3/08* | (2006.01) | |

(52) U.S. Cl.
CPC ............. *G01N 3/066* (2013.01); *G01N 3/04* (2013.01); *G01N 3/08* (2013.01); *G01N 2203/0016* (2013.01); *G01N 2203/0019* (2013.01); *G01N 2203/0037* (2013.01); *G01N 2203/0206* (2013.01); *G01N 2203/0252* (2013.01); *G01N 2203/0423* (2013.01)

(58) Field of Classification Search
CPC ... G01N 2203/0423; G01N 2203/0019; G01N 2203/016; G01N 2203/0206; G01N 2203/0252; G01N 2203/0037; G01N 3/066; G01N 3/04; G01N 3/08
See application file for complete search history.

(56) References Cited

U.S. PATENT DOCUMENTS 2,933,921 A    4/1960    Gloor

FOREIGN PATENT DOCUMENTS

| CN | 206057083 | 3/2017 |
|---|---|---|
| CN | 111208002 | 5/2020 |
| JP | 2015004631 A * | 1/2015 |
| KR | 200450492 | 10/2010 |

OTHER PUBLICATIONS

Instron: 5980 Series Universal Testing Systems, retreived from https://www.instron.us/products/testing-systems/universal-testing-systems/high-forcce-universal-testing-systems/5980-series-floor-models retreived on Oct. 5, 2020, 27 pages.

Int'l Search Report and Written Opinion Appln No. PCT/US2021/042682 mailed Oct. 20, 2021.

* cited by examiner

*Primary Examiner* — Jonathan M Dunlap
(74) *Attorney, Agent, or Firm* — McAndrews, Held & Malloy, Ltd.

(57) ABSTRACT

Described herein are examples of improved material (and/or universal) testing machines having a lower crossbeam that may be moved via a drive system of the material testing machine. In some examples, this may be accomplished via drive shafts with different threading in upper and lower portions, and/or independent drive systems for upper and lower crossbeams. The ability to dynamically adjust (e.g., raise) the lower crossbeam may allow an operator to interact with test samples at a more comfortable height, and reduce the need for an operator to repeatedly bend and/or kneel.

20 Claims, 4 Drawing Sheets

MATERIAL TESTING MACHINES WITH MOVABLE LOWER CROSSBEAMS

CROSS REFERENCE TO RELATED APPLICATIONS

This application is continuation of, and claims priority to, co-pending U.S. patent application Ser. No. 17/063,152, entitled "Material Testing Machines with Moveable Lower Crossbeams," filed Oct. 5, 2020, the entire contents of which being hereby incorporated by reference.

TECHNICAL FIELD

The present disclosure generally relates to material testing machines and, more particularly, to material testing machines with movable lower crossbeams.

BACKGROUND

Material testing machines are used to test the tensile strength and compressive strength of various test samples. The testing machines are able to perform a variety of different tests on a variety of different test samples. Some of the tests require stretching or compressing a test sample using a crossbeam of the material testing machine.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to material testing machines with movable lower crossbeams, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements. For example, reference numerals utilizing lettering (e.g., upper crossbeam 128*a*, lower crossbeam 128*b*) refer to instances of the same reference numeral that does not have the lettering (e.g., crossbeams 128).

DETAILED DESCRIPTION

In conventional material testing machines, only the upper crossbeam is movable, and the lower crossbeam is immovably fixed low to the ground, so that the machine can maximize test space (e.g., by extending from the floor to the ceiling). Unfortunately, this means that a human operator must bend or kneel down to insert or adjust a test sample on the lower crossbeam, which can cause stress and strain on the body, particularly when done repeatedly. While a base extender may be used to raise the lower crossbeam to a more comfortable height, raising the lower crossbeam in this way can also raise the top of the testing machine to an unacceptable height. Additionally, a single base extender cannot accommodate a variety of different operator heights and/or comfort zones. Further, constantly changing base extenders is both inefficient and an inconvenience.

Disclosed examples material testing machines (also referred to as universal testing machines) have a lower crossbeam that may be moved via a drive system of the material testing machine. The movable lower crossbeam provides both a comfortable working position for an operator and a wide range of motion of the material testing machine. The ability to dynamically adjust (e.g., raise) the lower crossbeam to a more comfortable height removes the need for an operator to repeatedly bend and/or kneel, thereby reducing the stress and/or strain on their body.

Some example of the present disclosure relate to a material testing machine, comprising a first crossbeam retained on a drive shaft; a second crossbeam retained on the drive shaft; the drive shaft configured to move the first and second crossbeams when actuated; and a drive system connected to the drive shaft, the drive system configured to actuate the drive shaft and move the first and second crossbeams via actuation of the drive shaft.

In some examples, the material testing machine further comprises a load measurement device retained by the upper crossbeam or lower crossbeam. In some examples, the first crossbeam or the second crossbeam comprise a nut engaged with the drive shaft. In some examples, the drive shaft comprises first screw threads extending in a first thread direction and second screw threads extending in a second thread direction that is different from the first thread direction. In some examples, the first crossbeam comprises a first nut engaged with the first screw threads. In some examples, the second crossbeam comprises a second nut engaged with the upper screw threads. In some examples, actuation of the drive shaft by the drive system moves the first crossbeam and second crossbeam in different directions.

Some examples of the present disclosure relate to a material testing machine, comprising a first crossbeam retained on a first drive shaft; a second crossbeam retained on a second drive shaft; the first drive shaft configured to move the first crossbeam when actuated; the second drive shaft configured to move the second crossbeam when actuated; a clutch assembly configured to selectively connect or disconnect the first drive shaft and the second drive shaft; and a drive system connected to, and configured to actuate, the first drive shaft, the actuation of the first drive shaft moving the first crossbeam, and the actuation additionally moving the second crossbeam when the first drive shaft is connected to the second drive shaft via the clutch assembly.

In some examples, the material testing machine further comprises a load measurement device retained by the first crossbeam or second crossbeam. In some examples, the first drive shaft comprises first screw threads extending in a first thread direction. In some examples, the first crossbeam comprises a first nut engaged with the first drive shaft. In some examples, the second drive shaft comprises second screw threads extending in a second thread direction that is different from the first thread direction. In some examples, the second crossbeam comprises an second nut engaged with the second drive shaft. In some examples, actuation of the first drive shaft and second drive shaft moves the first crossbeam and second crossbeam in different directions.

Some examples of the present disclosure relate to a material testing machine, comprising: a first crossbeam retained on a first drive shaft; a second crossbeam retained on a second drive shaft; the first drive shaft configured to move the first crossbeam when actuated; the second drive shaft configured to move the second crossbeam when actuated; a first drive system connected to the first drive shaft, the first drive system configured to move the first crossbeam via actuation of the first drive shaft; and a second drive system connected to the second drive shaft, the second drive system configured to move the second crossbeam via actuation of the second drive shaft.

In some examples, the material testing machine further comprises a load measurement device retained by the upper crossbeam or lower crossbeam. In some examples, the load measurement device comprises a load cell. In some examples, the first crossbeam comprises a first nut engaged with the first drive shaft, and the second crossbeam comprises a second nut engaged with the second drive shaft. In some examples, the first crossbeam comprises a first ball screw assembly engaged with the first drive shaft, and the second crossbeam comprises a second ball screw assembly engaged with the second drive shaft. In some examples, the material testing machine further comprises a bearing block that receives the first drive shaft and second drive shaft.

Figure 1:
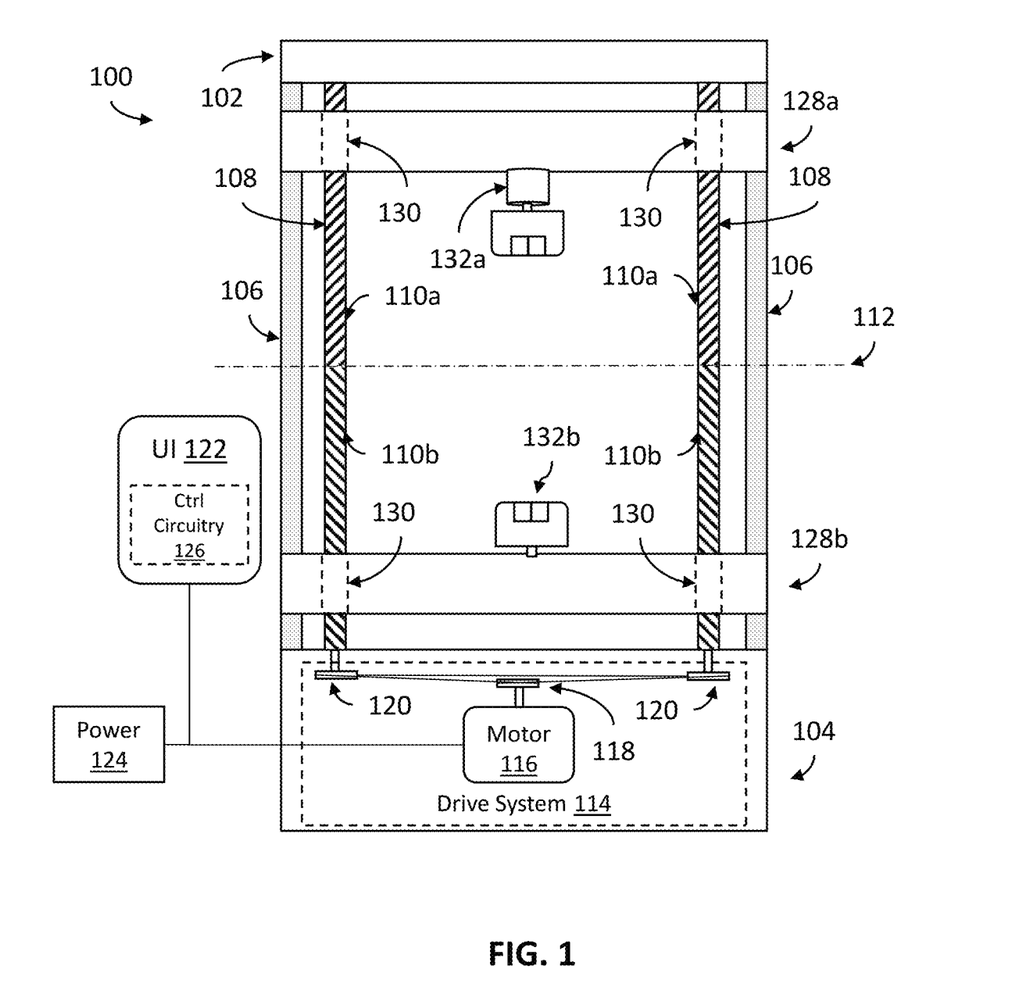
FIG. 1 shows an example material testing machine having movable upper and lower crossbeams, in accordance with aspects of this disclosure.

FIG. 1 shows an example improved material testing machine 100. As shown, the machine 100 includes a frame comprising a top plate 102 and a bottom base 104 connected by two guide rails 106 and two drive shafts 108. While two guide rails 106 and two drive shafts 108 are shown, in some examples, more or fewer guide rails 106 and/or drive shafts 108 may be used. In some examples, the drive shafts 108 are connected to the top plate 102 and bottom base 104 via bearings that allow the drive shafts 108 to rotate. While not shown in the example of FIG. 1 for the sake of clarity and understanding, in some examples, the guide rails 106 and/or drive shafts 108 may be enclosed in a housing.

In the example of FIG. 1, the drive shafts 108 have upper screw threads 110a and lower screw threads 110b. As shown, the upper screw threads 110a are threaded in a different direction than the lower screw threads 110b. In particular, the upper screw threads 110a are threaded in an opposite direction than the lower screw threads 110b. In the example of FIG. 1, a transition point between the upper screw threads 110a and lower screw threads 110b is at a centerline 112 that is at an approximately equal distance from the top plate 102 and base 104. In some examples, this centerline 112 transition point may be at a different location that is closer to the top plate 102 or bottom base 104.

In the example of FIG. 1, the example improved material testing machine 100 further includes a drive system 114 in the base 104 of the machine. As shown, the drive system 114 is connected to both drive shafts 108. In some examples, the drive system 114 is configured to actuate (e.g., rotate) both drive shafts 108.

In the example of FIG. 1, the drive system 114 includes a drive motor 116 that is connected to a driving pulley 118 via a rotor of the drive motor 116. The driving pulley 118 is connected to two driven pulleys 120 via one or more drive belts. Each driven pulley 120 is connected to a drive shaft 108 (e.g., either directly or through an intermediary mechanism, such as a rotor, ball bearing, and/or other component, for example). When the motor 116 actuates (e.g., rotates) the driving pulley 118, the driving pulley 118 actuates (e.g., rotates) the driven pulleys 120 via belt(s), which in turn actuates (e.g., rotates) the drive shafts 108.

While, in the example of FIG. 1, a simple drive system 114 is shown for ease of understanding, in some examples, the drive system 114 may be more complex. For example, the drive system 114 may include several drive motors 116, driving pulleys 118, rotors, and/or belts, and/or more than two driven pulleys 120. Additionally the drive system 114 may include intermediary pulleys and/or belts, as well as other components. In some examples, the drive system 114 may be located somewhere other than the base 104 (e.g., in the top plate).

In the example of FIG. 1, the material testing machine 100 further includes a user interface (UI) 122. As shown, the UI 122 is in (e.g., electrical) communication with the drive motor 116 of the drive system 114. In the example of FIG. 1, the material testing machine 100 further includes a power supply 124 in electrical communication with the UI 122 and drive system 114, in order to provide power to both. While shown as spaced from the other components of the material testing machine 100 for clarity and ease of understanding, in some examples, the power supply 124 and/or UI 122 may be attached to and/or integrated into the material testing machine 100 (e.g., via base 104 and/or housing).

In the example of FIG. 1, the UI 122 includes control circuitry 126. In some examples, the control circuitry 126 may include processing circuitry (and/or one or more processors) and memory circuitry. In some examples, the control circuitry 126 may be configured to control operation of the material testing machine 100 (e.g., via the drive system 114).

In some examples, the control circuitry 126 may be configured to translate commands received from a user to appropriate (e.g., electrical) signals that may be delivered to the drive system 114. In some examples, the UI 122 may include one or more input devices configured to receive commands from a user, and/or one or more output devices configured to provide outputs to the user. In some examples, the one or more input devices may comprise one or more touch screens, mice, keyboards, buttons, switches, slides, knobs, microphones, dials, and/or other electromechanical input devices. In some examples, the one or more output devices may comprise one or more display screens, speakers, lights, haptic devices, and/or other devices. In some examples, the UI 122 may further include one or more receptacles configured for connection to (and/or reception of) one or more external memory devices (e.g., floppy disks, compact discs, digital video disc, flash drive, etc.). In some examples, a user may control operation of the drive system 114 (and/or the material testing machine 100) via input devices and/or output devices of the UI 122.

In the example of FIG. 1, the example material testing machine 100 further includes an upper crossbeam 128a and a lower crossbeam 128b. The crossbeams 128 extend across a width of the frame, and are retained on the guide rails 106 of the frame. In some examples, each crossbeam 128 includes guide channels through which the guide rails 106 extend, such that movement of the crossbeam 128 is guided along the guide rails 106.

In the example of FIG. 1, each crossbeam 128 further includes drive shaft attachments 130 that couple the crossbeam 128 to the drive shafts 108. In some examples, the drive shaft attachments 130 may be fixedly secured to the crossbeams 128. In some examples, the drive shaft attachments 130 may comprise screw threaded nuts that engage with (e.g., Acme) screw threads 110 of the drive shafts 108.

In some examples, the drive shaft attachments 130 may comprise ball screw assemblies that engage with (e.g., ball) screw threads 110 of the drive shafts 108. In some examples, a ball screw assembly may include a screw threaded (e.g., ball) nut with ball bearings that ride in the screw threads 110 between the nut and the drive shafts 108 to decrease friction. In some examples, the drive shaft attachments 130 may be moved up and/or down the screw threads 110 of the drive shafts 108 when the drive shafts 108 are actuated (e.g., rotated), thereby moving the crossbeams 128 up and/or down the guide rails 106.

In the example of FIG. 1, each crossbeam 128 includes at least one testing instrument 132 retained on the crossbeam 128. As shown, the testing instrument 132a is a load measurement device retained on a portion of the upper crossbeam 128a that faces the lower crossbeam 128b. In some examples, the load measurement device may be a load cell configured to measure force (e.g., on the sample, grip, and/or crossbeam 128). In the example of FIG. 1, the testing instrument 132b is a fixture retained on a portion of the lower crossbeam 128b that faces the upper crossbeam 128a. In some examples, the fixture may be a compression platen configured to compress a testing sample, or a grip configured to hold a testing sample. Examples of grips include (but are not limited to) bolt holders, wedge grips, side acting grips, manual grips, roller grips, capstan grips, and/or syringe holders. In some examples, a crossbeam 128 may retain multiple testing instruments 132. While both crossbeams 128 are shown to have testing instruments 132 in the example of FIG. 1, in some examples, only one crossbeam 128 may have a testing instrument 132.

In some examples, the crossbeams 128 of the testing machine 100 may be moved up and/or down along the guide rails 106 via actuation of the drive system 114 (e.g., in response to commands provided through the UI 122). The opposing directions of the screw threads 110 on the upper and lower portions of the drive shafts 108 allow a single drive system 114 to move both the upper and lower crossbeams 128 at the same time. Thus, an operator may raise the lower crossbeam 128b to a more comfortable height when placing and/or adjusting a test sample on the lower crossbeam 128b.

The transition of the screw threads 110 at the centerline 112 ensures neither crossbeam 128 can move past the centerline 112. In some examples, a portion of the drive shafts 108 may be entirely unthreaded proximate the centerline 112, so as to doubly ensure the crossbeams 128 cannot proceed past the centerline 112. In some examples, an immovable stopper may be engaged to the drive shaft 108 proximate the centerline 112, to doubly ensure neither crossbeam 128 can proceed past the centerline 112.

The different screw threads 110 on the upper and lower portions of the drive shafts 108 means that the crossbeams 128 are moved in different (e.g., opposite) directions when the drive system 114 actuates the drive shafts 108. For example, the crossbeams 128 may be moved away from each other (i.e., farther apart) when the drive shafts 108 are actuated (e.g., rotated) in a first direction, and moved towards each other (i.e., closer together), when actuated in an opposite direction. Though this is a relatively low cost and efficient way to enable the lower crossbeam 128b to be dynamically raised, it also results in a smaller space for the test sample to be placed between the crossbeams 180, because the upper crossbeam 128 is lowered at the same time the lower crossbeam 128b is raised.

Figure 2:
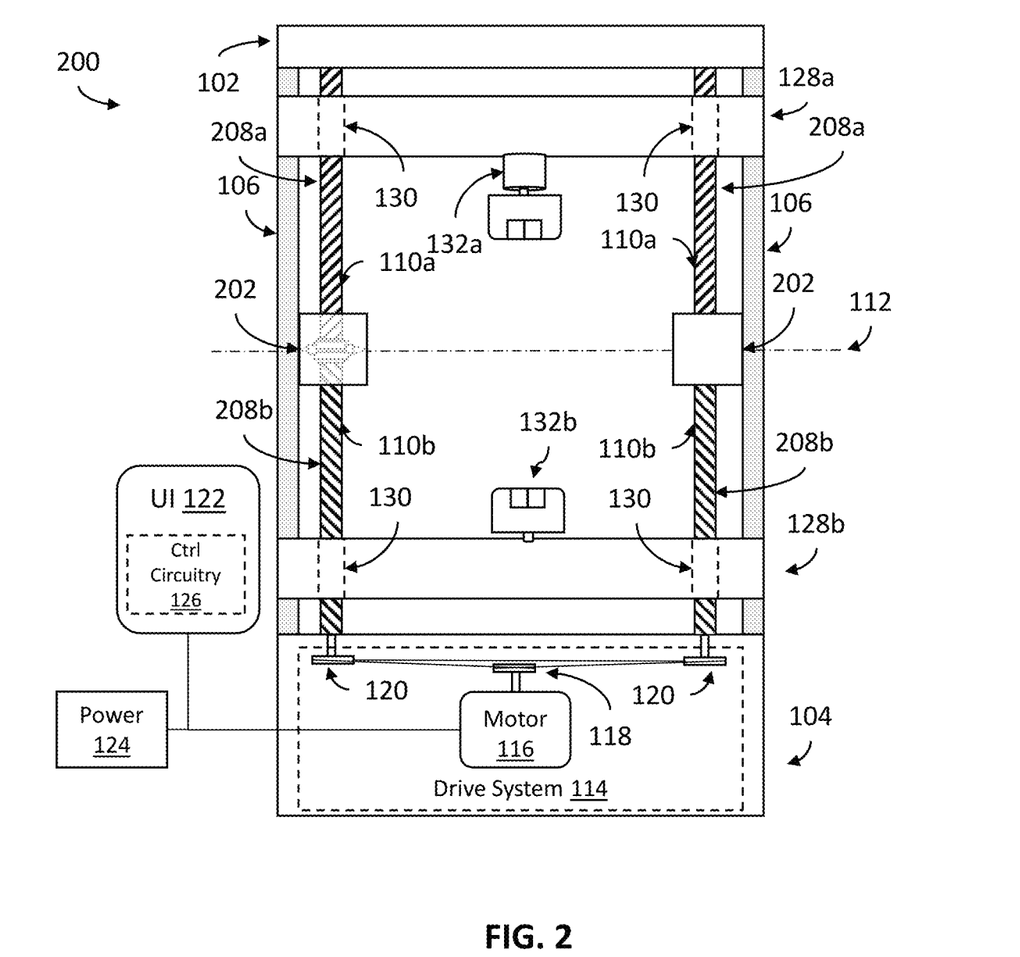
FIG. 2 shows a second example material testing machine, in accordance with aspects of this disclosure.

FIG. 2 shows another example material testing machine 200. The material testing machine 200 of FIG. 2 is identical to the material testing machine 100 of FIG. 1 in most respects. Like the material testing machine 100 of FIG. 1, the material testing machine 200 shown in FIG. 2 includes a frame having a top plate 102 and a bottom base 104 connected by two guide rails 106, with crossbeams 128 retained on the guide rails 106.

However, rather than two drive shafts 108, the material testing machine 200 of FIG. 2 has four drive shafts 208: two upper drive shafts 208a and two lower drive shafts 208b. The upper drive shafts 208a have upper screw threads 110a extending in a first direction, while the lower drive shafts 208b have lower screw threads 110b extending in an opposite direction. As shown, the upper drive shafts 208a are connected to the top plate 102 (and/or bearings in the top plate 102) at their top ends, and the lower drive shafts 208b are connected to the bottom base 104 (and/or bearings in the bottom base 104) at their bottom ends. The drive system 114 is connected to, and configured to actuate, the lower drive shafts 208b (e.g., via driven pulleys 120).

In the example of FIG. 2, the material testing machine 200 further includes clutches 202 that approximately bisect the centerline 112. In some examples, the clutches 202 may be positioned higher or lower than the centerline 112. As shown, the clutches 202 are attached to guide rails 106. In some examples, the clutches 202 may instead be attached to a housing of the testing machine 200, and/or otherwise attached (or unattached) to the testing machine 200. Though not shown for the sake of clarity, in some examples, the clutches 202 may be in (e.g., electrical and/or radio frequency) communication with UI 122 and power supply 124.

In the example of FIG. 2, the upper drive shafts 208a and lower drive shafts 208b have ends that terminate at clutches 202. For example, the lower drive shafts 208b may terminate at rotors that the clutches 202 secure against lateral movement while still allowing to spin (e.g., via bearings). The upper drive shafts 208a may terminate at hubs that the clutches 202 secure against lateral movement while still allowing to spin. In some examples, the clutches 202 may include clutch mechanisms configured to selectively couple and/or decouple the ends (e.g., hubs and rotors) of the upper drive shafts 208a and lower drive shafts 208b to one another at the clutches 202.

For example, the clutch mechanisms may include stationary electromagnets proximate the ends (e.g., rotors) of the lower drive shafts 208b. The electromagnets may have windings configured to conduct electric current. The clutch mechanisms may additionally include movable armatures attached to the ends of the upper drive shafts 208a (e.g., hubs). Electromagnetic force generated by current flowing through windings of the electromagnets may propel the armatures across an air gap and (e.g., frictionally) couple the ends (e.g., rotors) of the lower drive shafts 208b to the ends (e.g., hubs) of the upper drive shafts 208a, such that the upper drive shafts 208a and lower drive shafts 208b rotate together in unison. Springs may bias the armatures such that the armatures decouple from the ends (e.g., rotors) of the lower drive shafts 208b when the current stops flowing through the windings of the electromagnets and the electromagnetic force is withdrawn.

In some examples, the crossbeams 128 may be moved independently or in tandem depending on whether the clutches 202 couple or decouple the upper drive shafts 208a and lower drive shafts 208b. When the upper drive shafts 208a and lower drive shafts 208b are coupled together via clutches 202, actuation (e.g., rotation) of the lower drive shafts 208b (e.g., via drive system 114) also actuates the upper drive shafts 208a. Thus, when the clutches 202 are engaged, the crossbeams 128 move together, similar to the material testing machine 100 of FIG. 1. However, when the clutches 202 are disengaged and the upper drive shafts 208*a* and lower drive shafts 208*b* are decoupled from one another, the drive system 114 only actuates (e.g., rotates) the lower drive shafts 208*b*. Thus, when the clutches 202 are disengaged, the lower crossbeam 128 is moved by the drive system 114, while the upper crossbeam 128 remains stationary.

Independent movement of the lower crossbeam 128*b* makes the material testing machine more versatile. For example, it allows the material testing machine 200 to perform certain tests that require one crossbeam 128 be kept stationary. Additionally, the ability to move the lower crossbeam 128*b* independent of the upper crossbeam 128*a* may allow for a larger test space to be present between the crossbeams 128 when the lower crossbeam 128*b* is raised. For example, the upper crossbeam 128*a* can be set to remain stationary proximate the top plate 102 while the lower crossbeam 128*b* is raised, rather than being moved downward at the same time the lower crossbeam 128*b* is raised. The tradeoff is a slightly higher expense than the material testing machine 100 of FIG. 1, due to the addition of the clutches 202, as well as a dead zone proximate the clutches 202 that neither crossbeam 128 may traverse.

Figure 3:
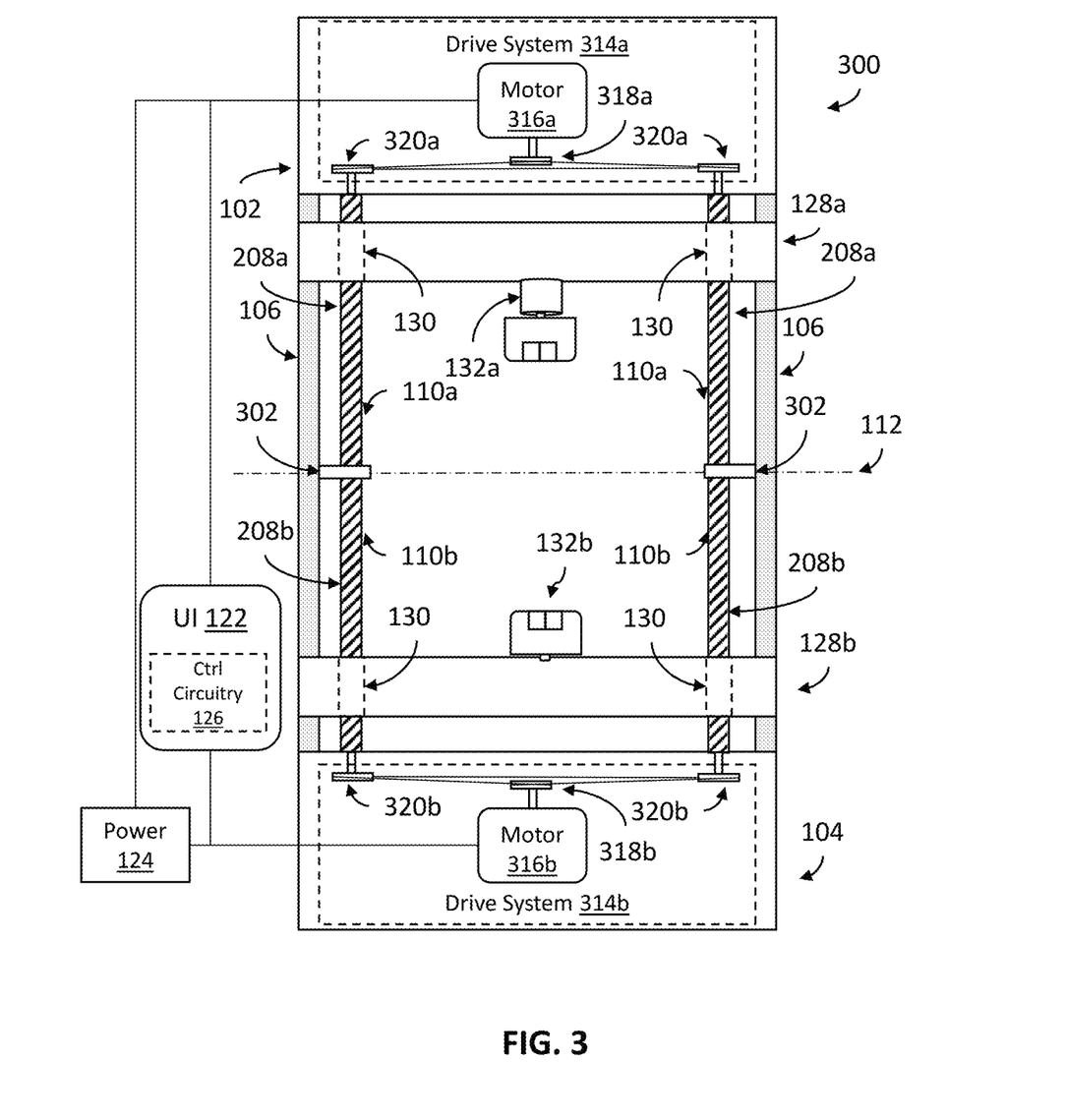
FIG. 3 shows a third example material testing machine, in accordance with aspects of this disclosure.

FIG. 3 shows another example material testing machine 300. The material testing machine 300 of FIG. 3 is identical to the material testing machine 200 of FIG. 2 in most respects. Like the material testing machine 200 of FIG. 2, the material testing machine 300 shown in FIG. 3 includes a frame having a top plate 102 and a bottom base 104 connected by two guide rails 106, with crossbeams 128 retained on the guide rails 106. The material testing machine 300 also has two upper drive shafts 208*a* and two lower drive shafts 208*b*.

However, rather than terminating at clutches 202, the upper drive shafts 208*a* and lower drive shafts 208*b* in the material testing machine 300 of FIG. 3 terminate at bearing blocks 302. Thus, rather than clutches 202 that can be selectively engaged and/or disengaged to couple and/or decouple the upper drive shafts 208*a* to the lower drive shafts 208*b*, the upper drive shafts 208*a* and lower drive shafts 208*b* are permanently decoupled. As shown, the bearing blocks 302 are attached to the guide rails 106 proximate the centerline 112. In some examples, the bearing blocks 302 may instead be retained by a housing of the material testing machine 300. In some examples, the bearing blocks 302 may instead be positioned higher or lower than the centerline 112. In some examples, the bearing blocks 302 may have bearings that allow the upper drive shafts 208*a* and lower drive shafts 208*b* to freely rotate in the bearing blocks 302.

Despite the absence of clutches 202, the lower crossbeam 128*b* of the material testing machine 300 shown in FIG. 3 can still move independently of the upper crossbeam 128*a* due to the two separate drive systems 314. In the example of FIG. 3, the material testing machine 300 includes an upper drive system 314*a* connected to the upper drive shafts 208*a*, and a lower drive system 314*b* connected to the lower drive shafts 208*b*. The lower drive system 314*b* is identical to the drive system 314 of FIGS. 1 and 2 (e.g., with motor 316*b*, driving pulley 318*b*, and driven pulleys 320). As shown, the upper drive system 314*a* is substantially similar (and/or identical) to the lower drive system 314*b*, except that the upper drive system 314*a* is positioned in the top plate 102 and connected to the upper drive shafts 208*a*. Both drive systems 314 are connected to power supply 124 and in communication with, and/or controllable via, the UI 122. Thus, the upper crossbeam 128*a* may be moved via actuation of the upper drive shafts 208*a* by the upper drive system 314*a*, while the lower crossbeam 128*b* may be moved via actuation of the lower drive shafts 208*b* by the lower drive system 314*b*.

In the example of FIG. 3, both crossbeams 128 may be moved independently of each other because of separate drive systems 314 that independently actuate separate upper drive shafts 208*a* and/or lower drive shafts 208*b*. Because the upper drive shafts 208*a* and/or lower drive shafts 208*b* are always separate, and/or separately actuated, the crossbeams 128 may be moved in different directions via different drive systems 314 rather than different screw threads 110. Thus, in the example of FIG. 3, the upper screw threads 110*a* are shown extending in the same direction as the lower screw threads 110*b*; though, in some examples, the upper screw threads 110*a* may extend in a different direction than the lower screw threads 110*b*.

The ability to move both crossbeams 128 independently of one another provides several advantages. As discussed above, being able to move the lower crossbeam 128*b* provides some ergonomic advantages. Additionally, the ability to keep one crossbeam 128 stationary while moving the other crossbeam 128*a* provides advantages, such as, for example, the ability to perform certain tests that require a stationary crossbeam 128. Also, the bearing blocks 302 provide less of a dead zone than the clutches 202. The tradeoff is that the addition of the upper drive system 314*a* may add significant costs.

Figure 4:
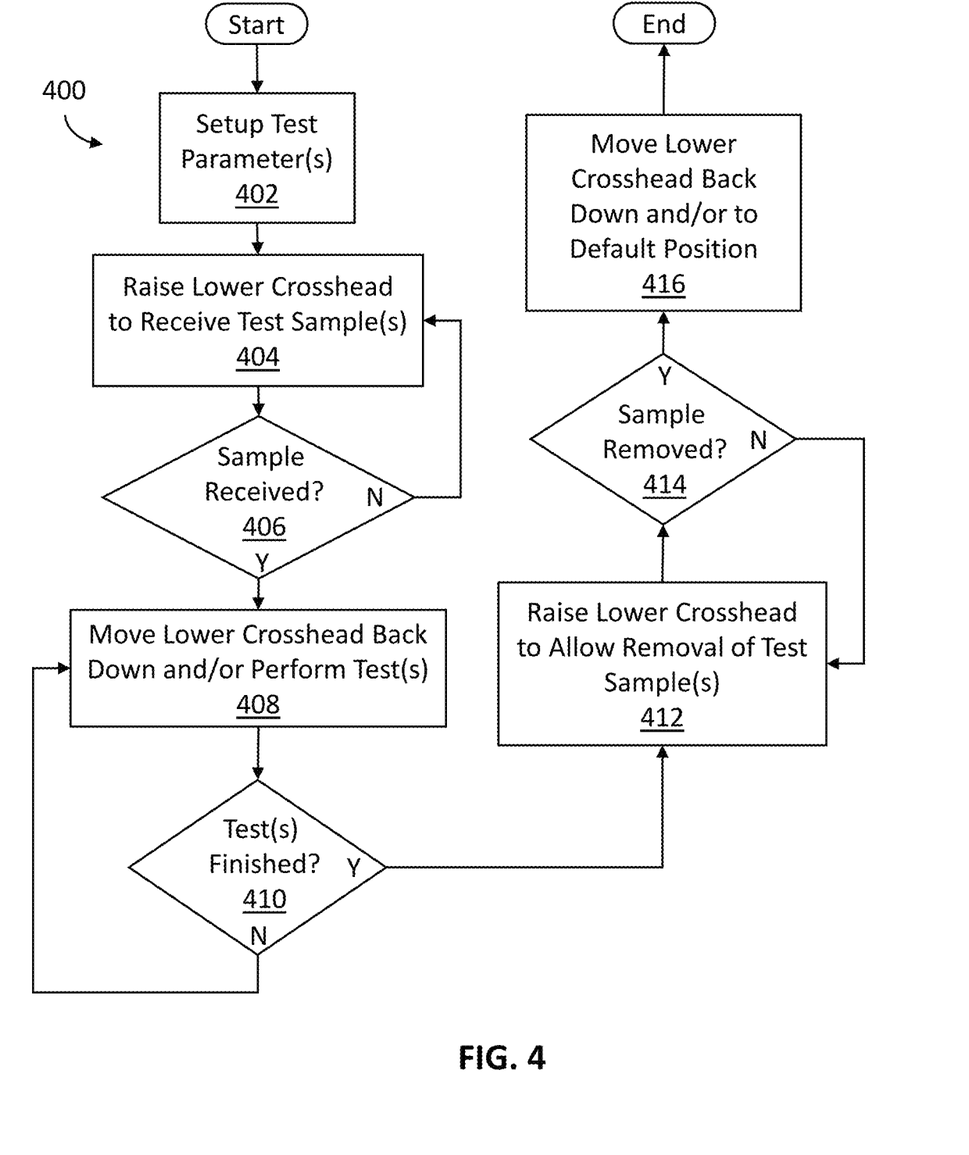
FIG. 4 is a flowchart illustrating an example operation of a material testing machine having movable upper and lower crossbeams, in accordance with aspects of this disclosure.

FIG. 4 is a flowchart illustrating an example operation 400 of the material testing machines 100, 200, 300. In some examples, the operation 400 may be used with any of the material testing machines 100, 200, 300. In some examples, the operation 400 may be implemented in machine readable (and/or processor executable instructions) stored in memory circuitry (e.g., of the control circuitry 126) and/or executed by the processing circuitry (e.g., of the control circuitry 126). In some examples, the operation 400 may be initiated and/or ended by a user (e.g., via UI 122). In some examples, the operation 400 may be initiated and/or ended automatically.

In the example of FIG. 4, the operation 400 begins at block 402. At block 402, the UI 122 receives (and/or prompts for) user input setting up one or more material tests. In some examples, this setup may include user input (and/or UI 122 reception) of one or more parameters of the test. For example, the user may enter information about the material to be tested (e.g., type, height, width, weight, etc.), the type(s) of test(s) to be performed, the duration of the test(s), information about the testing instrument(s) 132, the speed at which to move the crossbeam(s) 128 during the test(s), etc. In some examples, the UI 122 may receive (and/or prompt for) user input indicating that the setup has finished prior to proceeding.

In the example of FIG. 3, the operation 400 proceeds to block 404 after block 402. At block 404, the operation 400 raises the lower crossbeam 128*b* so that the user may insert the test sample(s) at a comfortable height. In some examples, the lower crossbeam 128*b* may be raised to a default height. In some examples, the lower crossbeam 128*b* may be raised to a user entered height (e.g., entered at block 402). In some examples, the lower crossbeam 128*b* may be raised to a height that is automatically determined (e.g., by the control circuitry 126) based on the type (and/or size) of the testing material and the available test space between the crossbeams 128.

In some examples, the lower crossbeam 128b may be raised to a different height depending on which material testing machine 100, 200, 300 is being used. For example, the material testing machine 100 may not be able to raise the lower crossbeam 128b as high as the material testing machines 200, 300, due to the decrease in test space caused by lowering the upper crossbeam 128a while at the same time raising the lower crossbeam 128b. In some examples, the material testing machines 200, 300 may raise (and/or retain) the upper crossbeam 128a to its maximum height (and/or retain the upper crossbeam 128a at its maximum height) before raising the lower crossbeam 128, so as to maximize the available test space.

In the example of FIG. 4, the operation 400 proceeds to block 406 after block 404. At block 406, the operation 400 determines whether the test sample has been received (e.g., by testing instrument(s) 132). In some examples, the UI 122 may receive (and/or prompt for) user input indicating that the sample has been received. In some examples, the operation 400 may automatically determine whether the test sample has been received through measurements from the test instrument(s) 132. As shown, the operation 400 returns to block 404 if the test sample has not been received.

In the example of FIG. 4, the operation 400 proceeds to block 408 after block 406 if the operation 400 determines the test sample has been received. At block 408, the operation 400 moves the lower crossbeam 128b back down to its lowest position, a default position, or a set position (e.g., set by tests parameter(s)), and/or proceeds with the test(s) outlined at block 402.

In the example of FIG. 4, the operation 400 proceeds to block 410 after block 408. At block 410, the operation 400 determines whether the one or more tests setup at block 402 have finished. In some examples, this determination may be based on certain test parameters setup at block 402 (e.g., test time(s), number of test(s), etc.) and/or measurements made by the test instrument(s) 132. In some examples, the determination may be based on user input received (and/or prompted for) by the UI 122. As shown, the operation 400 returns to block 408 if the one or more tests have yet to finish.

In the example of FIG. 4, the operation 400 proceeds to block 412 after block 410 if the operation 400 determines that the one or more tests have finished. At block 412, the operation 400 again raises the lower crossbeam 128b so that the user may remove the test sample(s) at a comfortable height. In some examples, the lower crossbeam 128b may be raised to a default, user entered, and/or automatically determined height, similar to that which is disclosed above with respect to block 404.

In the example of FIG. 4, the operation 400 proceeds to block 414 after block 412. At block 414 the operation 400 determines whether the sample has been removed. In some examples, this determination may be made based on measurements from the test instrument(s) 132 and/or based on user input received (and/or prompted for) by the UI 122, similar to that which is disclosed above with respect to block 406. As shown, the operation 400 returns to block 412 if the operation 400 determines the test sample has not been removed.

In the example of FIG. 4, the operation 400 proceeds to block 416 after block 414 if the operation 400 determines the test sample has been removed. At block 416, the operation 400 moves the lower crossbeam 128b back down to its lowest position, a default position, or a set position. While shown as ending after block 416, in some examples, the operation 400 may return to block 402 after block 416.

The disclosed material testing machines 100, 200, 300 improve over conventional material testing machines by providing a lower crossbeam 128 that may be moved via a drive system 314 of the material testing machine 100, 200, 300. Material testing machines 200, 300 further allow for independent movement of the upper and lower crossbeams 128, allowing for more versatility. The ability to raise the lower crossbeam 128 above its normally low position may lead to substantial ergonomic gains by reducing the need to repeatedly bend and/or kneel.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

What is claimed is:

1. A material testing machine, comprising:
   a first crossbeam positioned on a first drive shaft, the first drive shaft configured to move the first crossbeam when actuated;
   a second crossbeam positioned on a second drive shaft, the second drive shaft configured to move the second crossbeam when actuated; and
   a clutch assembly configured to selectively, and directly, connect or disconnect the first drive shaft and the second drive shaft to or from one another.

2. The material testing machine of claim 1, further comprising a drive system connected to, and configured to actuate, the first drive shaft, the actuation of the first drive shaft moving the first crossbeam.

3. The material testing machine of claim 2, wherein actuation of the first drive shaft additionally moves the second crossbeam when the first drive shaft is directly connected to the second drive shaft via the clutch assembly.

4. The material testing machine of claim 3, wherein actuation of the first drive shaft does not move the second crossbeam when the first drive shaft is not directly connected to the second drive shaft via the clutch assembly.

5. The material testing machine of claim 1, further comprising a load measurement device coupled to the first crossbeam or the second crossbeam.

6. The material testing machine of claim 1, wherein the clutch assembly comprises a first clutch assembly, the material testing machine further comprising a second clutch assembly configured to selectively, and directly, connect or disconnect a third drive shaft and a fourth drive shaft, the first crossbeam being positioned on the third drive shaft, and the second crossbeam being positioned on the fourth drive shaft.

7. The material testing machine of claim 6, wherein the first drive shaft and the third drive shaft are configured to move the first crossbeam when actuated, and the second drive shaft and the fourth drive shaft are configured to move the second crossbeam when actuated.

8. The material testing machine of claim 1, wherein the first crossbeam comprises a first nut engaged with the first drive shaft, or the second crossbeam comprises a second nut engaged with the second drive shaft.

9. The material testing machine of claim 1, wherein the first drive shaft comprises first screw threads extending in a first thread direction, and the second drive shaft comprises second screw threads extending in a second thread direction that is different from the first thread direction, or actuation of the first drive shaft and the second drive shaft moves the first crossbeam and the second crossbeam in different directions.

10. The material testing machine of claim 1, wherein the clutch assembly is configured to selectively, and directly, connect or disconnect a first end of the first drive shaft and a second end of the second drive shaft.

11. A material testing machine, comprising:
    a top plate;
    a bottom base;
    a first crossbeam positioned on first drive shafts extending between the top plate and the bottom base, the first drive shafts configured to move the first crossbeam when actuated;
    a second crossbeam positioned on second drive shafts extending between the top plate and the bottom base, the second drive shafts configured to move the second crossbeam when actuated;

a first drive system positioned at least partially within the bottom base, the first drive system being connected to the first drive shafts and configured to move the first crossbeam via actuation of the first drive shafts; and a second drive system positioned at least partially within the top plate, the second drive system being connected to the second drive shafts and configured to move the second crossbeam via actuation of the second drive shafts.

12. The material testing machine of claim 11, wherein actuation of the first drive shafts by the first drive system does not move the second crossbeam, or actuation of the second drive shafts by the second drive system does not move the first crossbeam.

13. The material testing machine of claim 12, wherein the first drive shafts extend from the bottom base towards the top plate, and the second drive shafts extend from the top plate towards the bottom base.

14. The material testing machine of claim 11, wherein the first drive system comprises first pulleys configured to move the first crossbeam via actuation of the first drive shafts.

15. The material testing machine of claim 14, wherein the second drive system comprises second pulleys configured to move the second crossbeam via actuation of the second drive shafts.

16. The material testing machine of claim 15, wherein the first drive system further comprises a first motor configured to move the first crossbeam via actuation of the first pulleys.

17. The material testing machine of claim 16, wherein the second drive system further comprises a second motor configured to move the second crossbeam via actuation of the second pulleys.

18. The material testing machine of claim 11, further comprising a load measurement device positioned on the first crossbeam or the second crossbeam.

19. The material testing machine of claim 18, wherein the first crossbeam comprises first nuts engaged with the first drive shafts, the second crossbeam comprises second nuts engaged with the second drive shafts, the first crossbeam comprises first ball screw assemblies engaged with the first drive shafts, or the second crossbeam comprises second ball screw assemblies engaged with the second drive shafts.

20. A material testing machine, comprising:
a first crossbeam positioned on a first drive shaft, the first drive shaft configured to move the first crossbeam when actuated;
a second crossbeam positioned on a second drive shaft, the second drive shaft configured to move the second crossbeam when actuated;
a clutch assembly configured to selectively connect or disconnect the first drive shaft and the second drive shaft; and
a drive system connected to, and configured to actuate, the first drive shaft,
the actuation of the first drive shaft moving the first crossbeam and the second crossbeam when the first drive shaft is connected to the second drive shaft via the clutch assembly, and
the actuation of the first drive shaft moving the first crossbeam and not moving the second crossbeam when the first drive shaft is not connected to the second drive shaft via the clutch assembly.

\* \* \* \* \*